United States Patent

Nguyen et al.

[11] Patent Number: 6,055,600
[45] Date of Patent: Apr. 25, 2000

[54] METHOD AND APPARATUS FOR DETECTING THE PRESENCE AND IDENTIFICATION OF LEVEL TWO CACHE MODULES

[75] Inventors: Thoi Nguyen, Austin; Richard Nicholas Iachetta, Jr., Pflugerville; Yashwant Sakarchand Kothari; Allan Rowe Steel, both of Austin, all of Tex.; Keith Alan Cox, Campbell, Calif.

[73] Assignee: International Business Machines Corporation, Armonk, N.Y.

[21] Appl. No.: 08/772,046

[22] Filed: Dec. 19, 1996

[51] Int. Cl.[7] .................................................. G06F 12/00
[52] U.S. Cl. ........................ 711/100; 711/118; 711/119; 711/126; 395/427; 395/500.44
[58] Field of Search .................................. 711/100, 117, 711/118, 119, 126, 141, 144, 3, 145; 395/284, 427, 500.44

[56] References Cited

U.S. PATENT DOCUMENTS

| 4,679,167 | 7/1987 | Finnell ..................................... 395/651 |
| 4,819,149 | 4/1989 | Sanik et al. ............................. 364/132 |
| 5,245,615 | 9/1993 | Treu et al. . |
| 5,283,877 | 2/1994 | Gastinel et al. . |
| 5,353,431 | 10/1994 | Doyle et al. . |
| 5,375,084 | 12/1994 | Begun et al. . |
| 5,446,860 | 8/1995 | Dresser et al. ......................... 395/427 |
| 5,491,804 | 2/1996 | Heath et al. . |
| 5,530,887 | 6/1996 | Harper et al. . |
| 5,534,856 | 7/1996 | Cadman .............................. 340/825.34 |
| 5,546,448 | 8/1996 | Caswell et al. ........................ 379/142 |
| 5,566,324 | 10/1996 | Kass ....................................... 711/160 |
| 5,594,873 | 1/1997 | Garrett ................................... 710/101 |
| 5,598,540 | 1/1997 | Krueger .................................. 710/104 |
| 5,887,146 | 3/1999 | Baxter et al. ........................... 710/104 |
| 5,898,856 | 4/1999 | Dodd et al. ............................. 711/118 |
| 5,953,515 | 9/1999 | Coteus et al. ....................... 395/500.44 |

OTHER PUBLICATIONS

Micron technology,Inc. 1996 DRAM data book, pp. 6–67 to 6–72, 1995.

Micron technology, Inc. 1997 DRAM data book Inc. pp. 9–81 to 9–91.

Abstract –Cache Memory Identity Processing Circuit, JP4283845 A Oct. 8, 1992, (19921008), Hashimoto Takatoshi, Koufu Nippon Denki KK (A Japanese company or corporation, JP.

Primary Examiner—Do Hyun Yoo
Assistant Examiner—Mehdi Namazi
Attorney, Agent, or Firm—David A. Mims, Jr.

[57] ABSTRACT

A method and apparatus for detecting and identifying the attributes of level-2 (L2) memory cache modules in a computer system. An ID Module is attached to each L2 cache memory module containing memory attribute information such as size, presence or absence of parity, synchronous or asynchronous access ability, electrical timing, etc. The information is accessible using a parallel or serial interface.

9 Claims, 3 Drawing Sheets

METHOD AND APPARATUS FOR DETECTING THE PRESENCE AND IDENTIFICATION OF LEVEL TWO CACHE MODULES

FIELD OF THE INVENTION

The present invention relates to data processing systems, and more particularly, to detecting the presence and identity of level-two cache memory modules in a computer system.

BACKGROUND OF THE INVENTION

Modern computers have seen skyrocketing clock speeds which have allowed faster instruction execution and increased work throughput. Memory systems coupled to these computer systems have also increased in speed and complexity due to numerous system memory configurations, resulting from different memory attributes choices such as size, parity, non-parity, synchronous, asynchronous, etc. The task of identifying a particular computer system's memory configuration presents a daunting task.

One prior art technique uses switches or jumpers to define memory size, location, or other memory attributes. This approach allows the computer system to retain the memory attributes when power to the system is turned-off. The technique, nevertheless, is cumbersome because of the requirement to reconfigure the switches or jumpers due to changes in memory modules having different memory attributes. In addition, a user making the memory module changes must have some degree of mechanical aptitude due to the requirement to remove the covers of the computer system, identify and replace a desired memory module.

Another prior art technique discloses the use of hard wiring a two-bit identification (ID) value on a memory card to allow identification of the vendor, size and speed of a particular dynamic random access memory (DRAM) module. The two-bit identification value is hard wired either to ground or voltage for each of four cross bar switches assigned to each dynamic memory module. During a DRAM refresh cycle, the two-bit identification value is gated to a memory controller through the cross bar switches to form an identification byte. The technique thus eliminates the need to change jumpers or switches when a memory card is changed in the computer system. However, a user is still unable to directly determine the presence and identity of the memory module. The technique not only requires four cross bar switches for each memory module on the card, but also requires a memory controller to examine the two-bit values on each cross bar switch and concatenate the values into an information byte. In addition, the hard-wired two-bit identification values must be done when the card is manufactured which limits any future changes to the cards.

Yet another prior art technique discloses a programmable memory address decoder for a computer system where a static random access memory (SRAM) is programmed by a processor using embedded firmware and programmable logic arrays (PLA). The programmable memory address decoder is capable of storing memory attribute information for a plurality of dynamic single inline memory modules (SIMMs) in its SRAM. This memory attribute information conveys whether single-sided or double-sided SIMMs are inserted into one of four banks, or whether the SIMMs should be used as an external cache. However, this technique must rely on the firmware stored in the memory controller to determine what memory modules are populated in the computer system. In addition, the memory controller is incapable of reading directly from the populated memories themselves to determine the presence and identity of a second level cache memory module.

The problems of detecting and identifying memory modules is exacerbated by the use of n-th level cache memories. An n-th level cache is n-1 levels away from a Central Processor Unit (CPU). A first level cache (also called an internal, primary, level-1 or L1 cache) is usually built into the processor chip itself, while second level caches (also called external, secondary, level-2 or L2 cache) and higher level caches are usually outside the processor chip. Some computer systems may have levels beyond L2, but generally, each cache level away from the processor (e.g., larger values of n) is typically larger, but slower then levels closer to the processor.

Consequently, it would be desirable to provide a technique for directly detecting the presence and identity of second level cache memory modules in a computer system.

SUMMARY OF THE INVENTION

This invention relates to a method and apparatus for detecting and identifying the attributes of level-2 (L2) memory cache modules in a computer system. An Identification Module (ID Module) is attached to each memory module containing memory attribute information such as size, presence or absence of parity, synchronous or asynchronous access ability, electrical timing, etc. The information is accessed using parallel or serial interfaces. The parallel interface provides four control signals to access the memory attribute information from the L2 module. Alternatively, a serial interface utilizes a start bit followed by an eight bit control byte to access the EEPROM and return memory attribute information in an eight bit data byte. Since each ID Module will use either the serial or the parallel methods of accessing the data, the signals for both interfaces can be shared.

DETAILED DESCRIPTION OF THE EMBODIMENTS

This invention provides a method and apparatus for detecting and identifying the memory attributes of level-2 (L2) cache memory modules in a computer system. A L2 cache memory module has multiple memory attributes which include size, parity, non-parity, synchronous, asynchronous, electrical timing, tag width fields, etc. The memory attributes for each cache memory module is stored in an ID Module on the cache memory module. The memory attributes are accessed using a serial or parallel interface to allow the computer system to support caches spanning the full range of performance and features. The procedure for detecting the presence and identity of L2 cache modules in a computer system using the invention will be more fully described using FIGS. 1–4.

Figure 1:
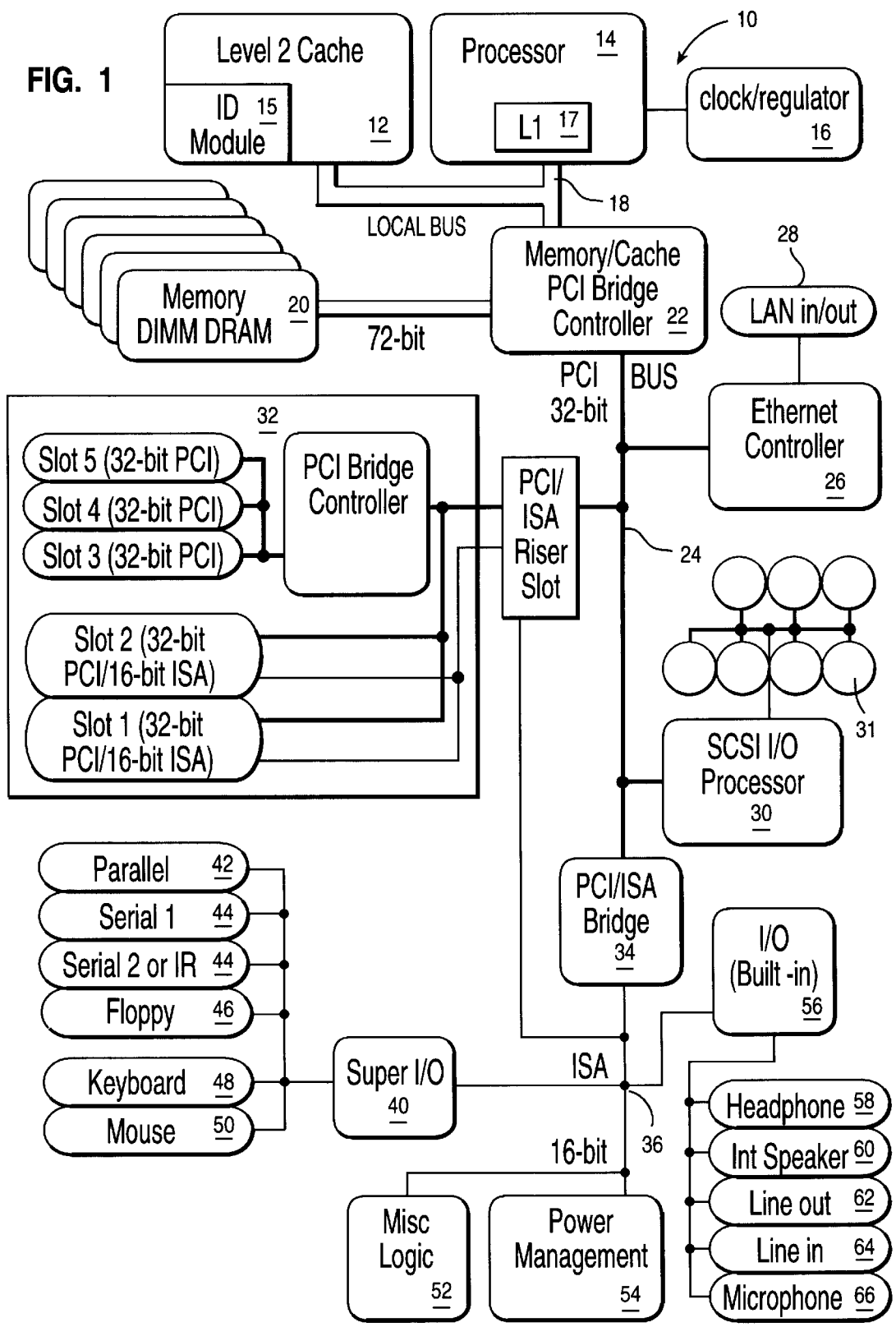
FIG. 1 is an illustrative embodiment of a computer system where the present invention may be practiced.

Referring now to FIG. 1, there is shown a pictorial representation of a computer system 10 where the invention may be practiced. The computer system 10 includes a processor 14 which contains an internal level-1 (L1) cache 17. In the preferred embodiment, processor 14 may be any member of the PowerPC 604 microprocessor family manufactured by the IBM Corporation. A clock/regulator 16 provides clock timing signals and core supply voltage for the processor 14. An external processor bus 18 exits processor 14 and interfaces with a L2 memory cache 12 module and a memory/cache Peripheral Component Interconnect (PCI) Bridge Controller 22. The L2 memory cache 12 module attached to processor bus 18 contains an ID Module 15 containing information to allow detection and identification of the L2 memory cache 12 module. In the preferred embodiment, the L2 cache may have a 256 KB, 512 KB or 1 MB memory module inserted in the computer system in any one of the configurations in the Parallel Interface Definition, shown in TABLE A, or the Serial Interface Definition shown in TABLE B. The memory/cache PCI Bridge Controller 22 converts the high speed processor bus 18 to one appropriate for use as a medium speed PCI bus 24. The memory/cache controller 22 also provides for the attachment of main store memory in the form of dual inline memory modules (DIMM) DRAM 20. The PCI bus 24 allows communication over a local area network (LAN) via an adapter such as an Ethernet controller 26. Small Computer Systems Interface (SCSI) devices 31 may also be attached to the PCI bus 24 via SCSI I/O processor 30. Slots 32 are provided for attaching devices that communicate with Processor 14 through PCI bus 24. A PCI/Industry Standard Architecture (ISA) bridge 34 converts the medium speed PCI bus 24 to an ISA bus 36. The ISA bus 36 allows attachment of power management 54 controls as well as any miscellaneous logic 52 required to communicate with the Processor 14. Any number of I/O devices may be attached through parallel 42 and serial 44 ports through super I/O port 40. This includes a floppy 46 disk, keyboard 48, and mouse 50. A second adapter provides for built-in I/Os 56 such as a headphone 58, internal speaker 60, microphone 66, line in 64 and line out 62 provisions.

TABLE A

| PD3 | PD2 | PD1 or SCLK | PD0 or SDATA | FUNCTION |
|---|---|---|---|---|
| 0 | 0 | 0 | 0 | 256KB, Synchronous Flow-Thru, No Par |
| 0 | 0 | 0 | 1 | 512KB, Synchronous Flow-Thru, No Par |
| 0 | 0 | 1 | 0 | 1MB, Synchronous Flow-Thru, No Parity |
| 0 | 0 | 1 | 1 | 256KB, Synchronous Pipeline, No Par |
| 0 | 1 | 0 | 0 | 256KB, Synchronous Flow-Thru, Parity |
| 0 | 1 | 0 | 1 | 512KB, Synchronous Flow-Thru, Parity |
| 0 | 1 | 1 | 0 | 1MB, Synchronous Flow-Thru, Parity |
| 0 | 1 | 1 | 1 | 512KB, Synchronous Pipeline, No Par |
| 1 | 0 | 0 | 0 | 256KB, Asynchronous, No Parity |
| 1 | 0 | 0 | 1 | 512KB, Asynchronous, No Parity |
| 1 | 0 | 1 | 0 | 1MB, Asynchronous, No Parity |
| 1 | 0 | 1 | 1 | 1MB, Synchronous Pipeline, No Par |
| 1 | 1 | 0 | 0 | Reserved |
| 1 | 1 | 0 | 1 | Reserved |
| 1 | 1 | 1 | 0 | Reserved |
| 1 | 1 | 1 | 1 | No Cache/Module ID via EEPROM |

Figure 2A:
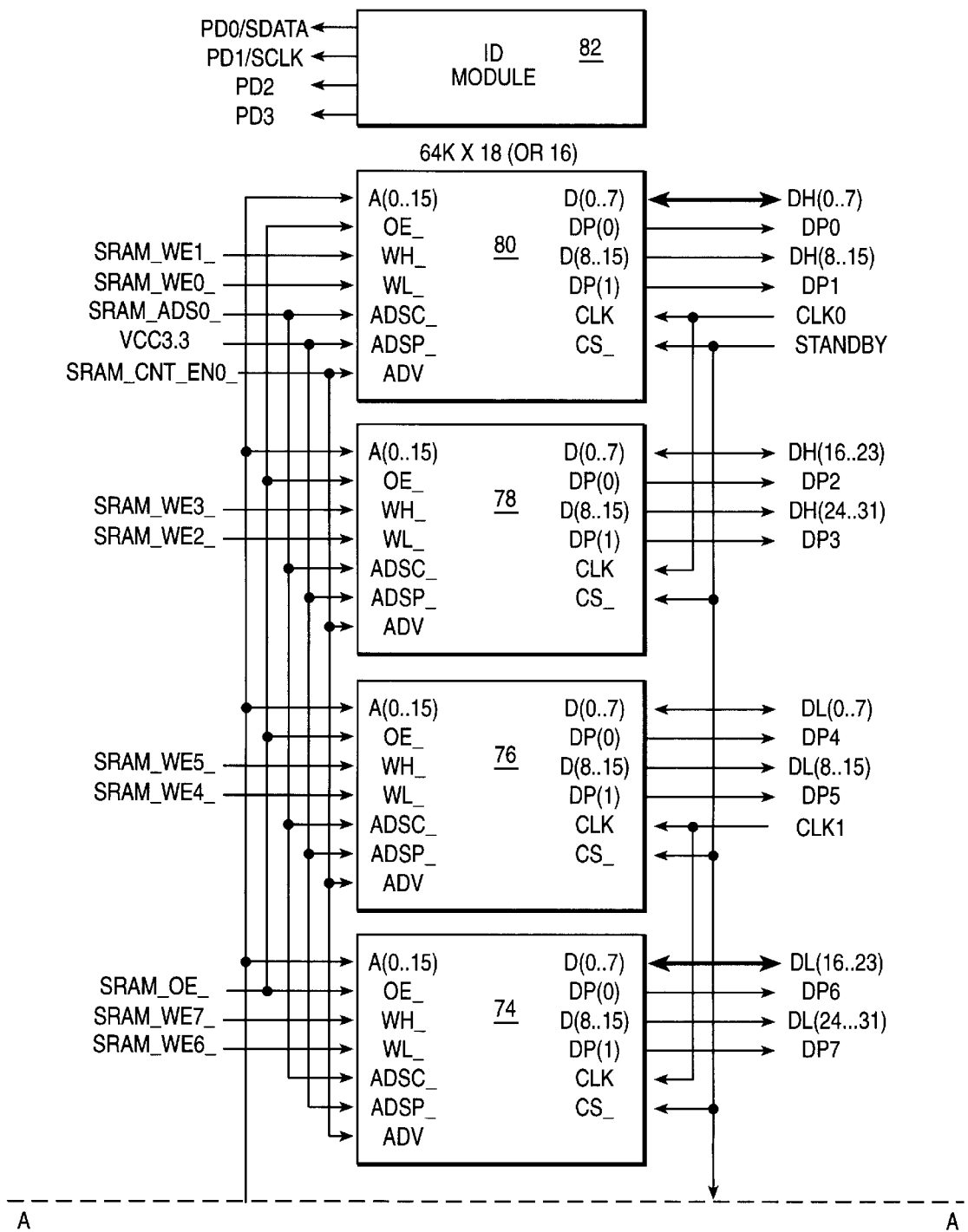
FIG. 2 is a pictorial of a level-2 cache memory module containing an ID Module as disclosed by this invention.
Figure 2B:
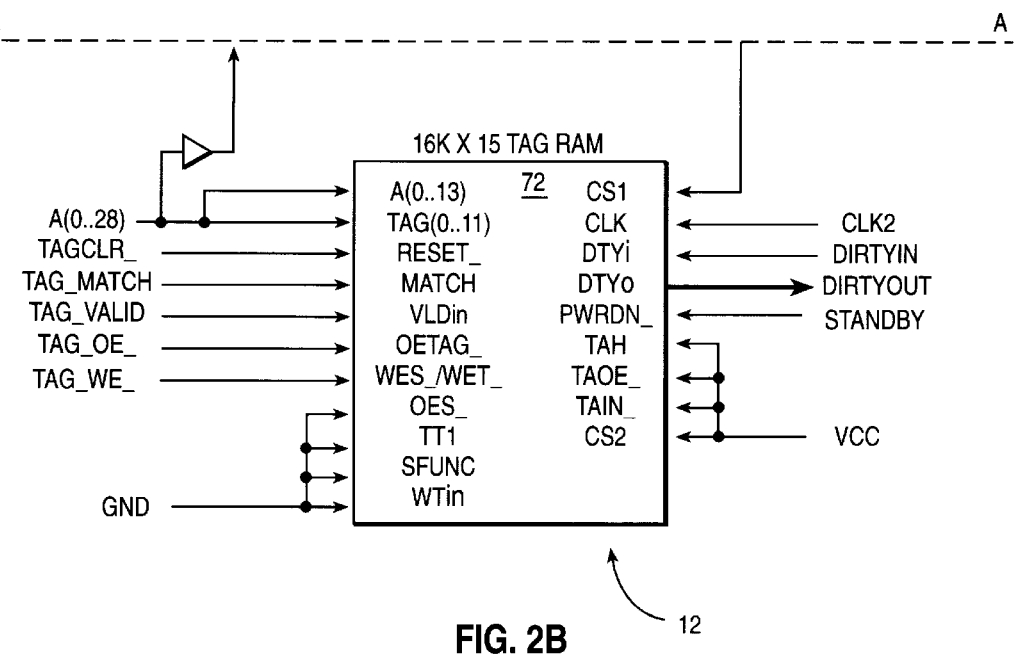

Referring now to FIG. 2, there is shown a pictorial of the level-2 (L2) cache 12 memory module of the invention. The L2 cache 12 shown is a 512 KB synchronous cache module having 64KB static ram (SRAM) memories 74–80, a tag ram and an ID Module 82. One skilled in the art will appreciate that the level-2 cache module 12 may be created in other memory size configurations such as 1 MB. The L2 cache memory modules are available from the IBM Corporation and use the signal definitions shown in TABLE C. The ID Module 82 allows the computer system to support caches spanning the full range of performance and features. The ID Module 82 contains module pertinent information including memory size, electrical timing, tag width fields, and other unique characteristics of the memory module. In the preferred embodiment, a Xicor X24C00 128-bit EEPROM is used to store the module pertinent information when the serial interface is used for the ID Module 82. When the ID Module 82 uses the parallel interface, the preferred embodiment is a bank of pullup and pulldown resistors. The processor will first attempt to access the ID Module 82 using the parallel interface. In the parallel interface, four present detect bits, PD<3..0>, are used to detect and identify the L2 cache as shown in TABLE A. If the present detect bits read 1111, the processor will try to interrogate the ID Module 82 using the serial interface, via two signals: serial clock (SCLK) and serial data (SDATA). SCLK and SDATA are shared on the same pins as PD<1..0> of the parallel interface. The meaning of the data returned on SDATA is shown in the Serial Interface Definition shown in TABLE B. If the serial interrogation also fails, the "no cache" condition is set.

TABLE B

| Byte Add | Bit Field | Parameter | Description |
|---|---|---|---|
| 0 | 0 | PD | Present detect. Programmed to 0. The serial data pin should be pulled-up on the CPU planar so that cacheless systems ran a 1 when accessing the ID ROM. |
| 0 | 1 | Parity | 0 = No Parity; 1 = Parity. |
| 0 | 2 | Write Back | 0 = Wrt Back not supported; 1 = Write Back supported. |
| 0 | 3 | Cache Type | Reset ( = 0) indicates timing is performed by C planar. Set ( = 1) indicates cache module contains on-board cache controller. |
| 0 | 4 | | Reserved |
| 0 | 5:7 | REV | Revision number. |
| 1 | 0:4 | n | Cache size = 2**(n + 1) Bytes. |
| 1 | 5:7 | p | Cache line size = 2**(p + 1) Bytes. This line & cache size used to determine the number of tag entries. |
| 2 | 0:3 | w | Tag data width = w + 1 bits. This is used to determine the amount of checkable RAM address space. |
| 2 | 4:7 | | RESERVED. |
| 3:4 | 0:7 | ID | Bytes 3 & 4 define two character ASCII encoding for Manufacr' ID. |
| 5 | 0:1 | Tag Type | 00 = Async Tag RAM, resettable; 01 = Sync Tag RAM, resettable; 10 = Async RAM, not resettable, software must init the tag 11 = Reserved. |
| 5 | 2 | | RESERVED. |
| 5 | 3:7 | Tag Speed | Binary value encoding SRAM read data access in nanoseconds. |
| 6 | 0:1 | SRAM Type | 00 = Async RAM; 01 = Sync RAM; 10 = Sync Pipeline; 11 = Reserved |
| 6 | 2 | | RESERVED |
| 6 | 3:7 | SRAM Speed | Binary value encoding SRAM read data access time in nanosecond. |
| 7 | 0:7 | FMAX | Sync SRAM max clock freq in MHZ. |
| 8 | 0:1 | SRAM Voltage | SRAM signaling volts: 00 = 5V; 01 = 3.3V; 10 = 2.5V; 11 = Reserved. |
| 8 | 2:3 | TAG Voltage | Tag RAM signaling volts: 00 = 5V; 01 = 3.3V; 10 = 2.5V; 11 = Reserved. |
| 8 | 4 | | RESERVED. |
| 8 | 5:7 | Data Type | Identifier for implementation dependent data. |
| 9:15 | | Data Filed | Implementation Dependent Data. |

Figure 3:
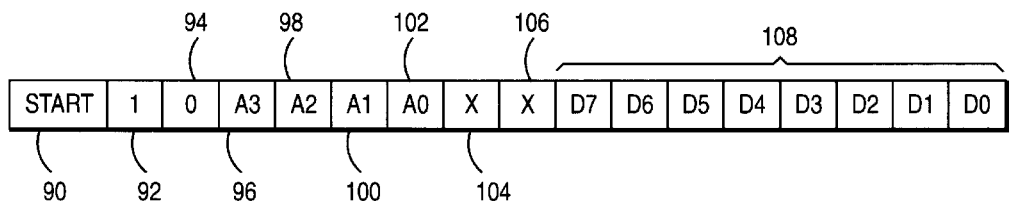
FIG. 3 is a serial communication protocol for accessing a level-2 cache ID Module.

Referring to FIG. 3, there is shown a serial communication protocol for accessing the contents of the ID Module 82.

A start bit 90, followed by an eight bit control byte 92–106, and a returned eight bit data byte 108. The control byte 92–106 consists of a two bit read command 92, 94 (1,0), a four bit address 96–102, and two don't care bits 104–106. The four bit address 96–102 selects which of the 16 bytes to read.

Figure 4:
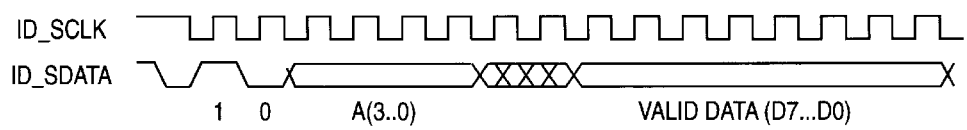
FIG. 4 is a timing diagram for accessing a level-2 (L2) cache using the disclosed invention.

Referring now to FIG. 4, there is illustrated a timing diagram for accessing the EEPROM of the invention. The start bit 90 begins a high-to-low transition of identification of EEPROM serial data (SDATA) signal when the identification of EEPROM serial clock is held high. With the exception of the start bit 90, all state transitions of SDATA must occur while SCLK is low. A stop condition is a low-to-high transition of SDATA when SCLK is high. Data is valid when SCLK is high. TABLE B describes the EEPROM definitions for the L2 memory cache for a serial interface.

TABLE C

SIGNAL DESCRIPTION

| SYMBOL | SIGNAL | I/O | DESCRIPTION |
|---|---|---|---|
| A(0:28) | Address | I | Physical address of the data. |
| ADDR(0:1) | Address | I | Address bits async SRAMs. |
| CLK(0:4) | Clocks | I | CLK(0, 1, 3, 4) for SRAMs; CLK(2) for TAG_RAM |
| DH(0:31) | Data | I/O | High order four bytes cache data |
| DL(0:31) | Data | I/O | Low order four bytes cache data |
| DP(0:7) | Data Parity | I | Byte wide parity bits for 8 bytes cache data. DP(0) for DH(0 . . . 7); DP(1) for DH(8 . . . 15) . . .; DP(6) for DL(16 . . . 23); DP(7) for DL(24 . . . 31). |
| PD0/SCLK | Present Detect | O or I | Present Detect bit O or EEPROM serial clock. |
| PD1/SDATA | Present Detect | O | Present Detect bit 1 or EEPROM serial data. |
| PD(2:3) | Present Detect | O | Present Detect bit 2 and 3. |
| SRAM_ADS(0:1)_ | SRAM Address Strobe | I | SRAM Address Strobe. |
| SRAM_ALE | SRAM ALE | I | SRAM Address Latch Enable |
| SRAM_CNT_EN(0:1)_ | SRAM Control Enable | I | Control Enable of the SRAMs |
| SRAM_OE(0:1) | SRAM Output Enable | I | These signals enable the output drivers of the SRAMs. |
| SRAM_WE(0:7) | SRAM Output Enable | I | Read/Write control of the SRAMS |
| BURST_MODE | Burst Mode | I | Burst Mode: 0 = linear, 1 = interleaved. |
| TAG_CLR | TAG Clear | I | Signal to clear TAG RAM |
| TAG_MATCH | TAG Match | O | Signal to indicate a TAG RAM match. |
| TAG_VALID | TAG RAM Valid | O | Signal to indicate TAG RAM valid. |
| TAG_OE | TAG Output Enable | I | These signals enable the output drivers of the TAG RAM. |
| TAG_WE | TAG Write Enable | I | Read/Write control of the TAG RAM. |
| DIRTYIN | DIRTY IN | I | Dirty Input bit signal |
| DIRTYOUT | DIRTY Out | O | Dirty Output bit signal |
| STANDBY | Stand By | I | Signal to put SRAM/TAG RAM in standby mode. |
| VCC3.3 (10) | +3.3V | I | +3.3 Volts |
| VCC5 (10) | +5.0V | I | +5.0 Volts |
| GND (24) | Ground | O | Electrical Ground for L2 cache |

The invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system having a processor, for detecting and identifying a level-2 cache memory in said computer system, comprising the steps of:

providing a level-2 cache memory having a plurality of memory modules thereon connected to said processor, wherein said memory modules contain information retrieval by said processor;

connecting an ID Module having identification information stored therein for said plurality of memory modules to said level-2 cache in said computer system;

accessing said ID Module by said processor using a plurality of parallel interface bits and returning said identification information therein to said processor;

interpreting said identification information by said processor and comparing said identification information to a predetermined value indicating a need for access via a serial interface to determine the memory modules on said level-2 cache; and accessing said ID module using said serial interface using a subset of said plurality of parallel interface bits to determine the memory modules on said level-2 cache when said predetermined value is detected by said processor.

2. The method of claim 1 wherein the step of accessing said ID Module further comprises:

interrogating said ID Module by said processor via said plurality of parallel interface bits; and returning a four bit identification value for said plurality of parallel interface bits to said processor for the memory module on said level-2 cache.

3. The method of claim 1 wherein the step of accessing said ID Module using said serial interface further comprises:

interrogating said ID Module by said processor via said serial interface; and returning a two bit identification value to said processor for the memory module on said level-2 cache using two of said plurality of parallel interface bits.

4. The method of claim 1, wherein the ID Module is an electrically erasable read only memory.

5. An apparatus for detecting and identifying a level-2 cache module in a computer system, comprising:

means for connecting said level-2 cache module having a plurality of read and write devices to a processor in said computer system for information retrieval;

means for connecting an ID Module to said level-2 cache module having a plurality of memory attributes stored therein for said plurality of read and write devices;

means for directly accessing said ID Module on said level-2 cache module using a plurality of parallel interface bits by said processor to determined the memory attributes of said read and write devices;

means for interpreting said parallel interface bits by said processor and identifying a predetermined value indicating a need for accessing said ID module via a serial interface; and means for accessing said ID module using said serial interface using a subset of said plurality of parallel interface bits to determine the memory modules on said level-2 cache when said predetermined value is detected by said processor.

6. The apparatus of claim 5 wherein said means for directly accessing said ID Module further comprises:

means for interrogating said ID Module by said processor by said parallel interface bits; and means for returning a four bit identification value by said parallel interface bits to said processor for the memory modules on said level-2 cache.

7. The apparatus of claim 5, wherein the means for accessing said ID Module using said serial interface comprises:

means for interrogating said ID Module by said processor for said memory attributes by said serial interface; and means for returning the contents of said ID Module containing said memory attributes using two of said plurality of parallel interface bits by said serial interface.

8. The apparatus of claim 5 wherein the identification value is from a bank of resistors.

9. The apparatus of claim 5 wherein the ID Module is an electrically erasable read only memory.

* * * * *